United States Patent [19]

Rennex

[11] Patent Number: 5,129,279
[45] Date of Patent: Jul. 14, 1992

[54] FLEXIBLE ROBOTIC LIMB

[76] Inventor: Brian G. Rennex, 431 Muddy Branch Rd., #101, Gaithersburg, Md. 20878

[21] Appl. No.: 662,131

[22] Filed: Feb. 28, 1991

[51] Int. Cl.⁵ .................. B25J 17/00; B25J 18/02
[52] U.S. Cl. ........................ 74/479; 74/89.15; 74/586; 414/735; 901/15; 901/22; 901/23; 901/28
[58] Field of Search .............. 74/89.15, 479, 586; 901/15, 22, 23, 24, 25, 28; 414/735

[56] References Cited

U.S. PATENT DOCUMENTS

| | | | |
|---|---|---|---|
| 1,329,645 | 2/1920 | Warrener, Sr. | 74/586 |
| 1,788,766 | 1/1931 | Kelley | 74/586 |
| 3,266,059 | 8/1966 | Stelle | 3/12.3 |
| 3,269,199 | 8/1966 | Deehan et al. | 74/586 X |
| 3,497,083 | 2/1970 | Anderson et al. | 214/1 |
| 3,520,496 | 7/1970 | Wuenscher | 244/1 |
| 3,580,099 | 5/1971 | Mosher | 74/521 |
| 3,712,481 | 1/1973 | Harwood | 74/469 X |
| 4,369,814 | 1/1983 | Humphrey | 138/120 |
| 4,494,417 | 1/1985 | Larson et al. | 74/469 |
| 4,568,311 | 2/1986 | Miyake | 414/378 X |
| 4,607,578 | 8/1987 | Inoue et al. | 108/145 |
| 4,621,965 | 11/1986 | Wilcock | 414/735 X |
| 4,651,589 | 3/1987 | Lambert | 74/469 |
| 4,685,349 | 8/1987 | Wada et al. | 74/479 |
| 4,697,472 | 10/1987 | Hiyase | 74/479 |
| 4,712,969 | 12/1987 | Kimura | 74/89.15 X |
| 4,766,775 | 8/1988 | Hodge | 74/479 |
| 4,805,477 | 2/1989 | Akeel | 74/479 |
| 4,806,068 | 2/1989 | Kohli et al. | 901/22 X |
| 4,848,179 | 7/1989 | Ubhayakar | 901/28 X |
| 4,863,206 | 9/1989 | Kaufmann | 901/16 X |
| 4,872,363 | 10/1989 | Rosenthal | 901/28 X |
| 4,874,998 | 10/1989 | Hollis, Jr. | 901/29 X |
| 4,907,937 | 3/1990 | Milenkovic | 74/469 X |
| 4,976,582 | 12/1990 | Calvel | 901/28 X |
| 5,028,180 | 7/1991 | Sheldon et al. | 901/23 X |

FOREIGN PATENT DOCUMENTS

| | | |
|---|---|---|
| 3612961A | 10/1986 | Fed. Rep. of Germany . |
| 89/09120 | 10/1989 | France . |
| 60-220255 | 11/1985 | Japan ......................... 74/479 |
| 558788 | 7/1977 | U.S.S.R. .................. 901/22 |
| 1194672 | 11/1983 | U.S.S.R. .................. 901/22 |
| 1222538 | 4/1986 | U.S.S.R. .................. 901/22 |
| 1296401 | 3/1987 | U.S.S.R. .................. 901/22 |
| 2083795 | 3/1982 | United Kingdom ........... 901/23 |

*Primary Examiner*—Allan D. Herrmann
*Attorney, Agent, or Firm*—Lowe, Price, LeBlanc & Becker

[57] ABSTRACT

This invention is a flexible limb capable of changing length, bending in any direction, twisting, and changing cross-sectional size. Its skeletal structural design promotes optimal simplicity of control, ease of construction, lightness, and stiffness.

9 Claims, 3 Drawing Sheets

FLEXIBLE ROBOTIC LIMB

BACKGROUND OF THE INVENTION

This invention relates to robotic limbs and, in particular, to a structural design which attempts to be optimally light and simple, for a given rigidity. This design allows lengthening and shortening along the length of the robotic limb, bending and twisting of the robotic limb in any hemispheric direction, and cross-sectional expansion and contraction of the robotic limb. It allows relatively simple open-loop control of these motions.

This invention is expected to work well in applications such as space exploration where weight is an overriding consideration and in applications such as extremely versatile manipulations of robots of the future.

The prior art includes a number of flexible limbs with multi-articulation units. The following examples have multiple hinges turned by tendon-drive systems: Stelle (U.S. Pat. No. 3,266,059), Anderson (3,497,083), and Wada (U.S. Pat. No. 4,685,349). Examples of gear-driven multiple hinges include Wuenscher (U.S. Pat. No. 3,520,496), Miyake (U.S. Pat. No. 4,568,311), Inoue (U.S. Pat. No. 4,607,578), (U.S. Pat. No. 4,621,965), Hiyane (U.S. Pat. No. 4,697,472), Hodge (U.S. Pat. No. 4,766,775), Akeel (U.S. Pat. No. 4,805,477), Kaufmann (U.S. Pat. No. 4,863,206) and Milenkovic (U.S. Pat. No. 4,907,937). Harwood (U.S. Pat. No. 3,712,481) provides for articulation with rotating wedges. Humphrey (U.S. Pat. No. 4,369,814) utilizes hydraulic action about a slidably anchored gimbal, and Mosher (U.S. Pat. No. 3,580,099) uses hydraulic action about hinged joints.

Hollis (U.S. Pat. No. 4,874,998) utilizes magnetically levitated articulation units, and Larson (U.S. Pat. No. 4,494,417) uses actuators to articulate about double-hemispheric segments. Krue (D.E. 3612-961-A) provides for actuation with hinged double-actuators which interconnect plates to allow articulation. The above patents describe inventions with articulation means that are clearly distinct from the present invention.

There are three related patents in the prior art which are similar in principle to each other, namely Lambert (U.S. Pat. No. 4,651,589), Kimura (U.S. Pat. No. 4,712,969) and Ubhayaker (4,848,179). These utilize three actuators positioned between two plates and connected by universal joints to said two plates. In this configuration, additional provision is required to prevent sliding motion between these two plates, to ensure rigidity of the whole arm structure. Kimura accomplishes this provision in two ways. In his first embodiment he uses an actuator consisting of double-link mechanism which is caused to open and close by a component actuator rotatably attached to the midportion of each link. The fact that the link is a hinge, with a single degree of freedom and the fact that there are three such hinges, configured equilaterally, result in the required additional provision to constrain the two plates from sliding with respect to each other. Lambert has a very similar design incorporating three components which combine actuation and a hinged double-link system.

Ubhayaker uses a similar constraint. In addition to his three actuators, he uses three stabilizer bars which are double links connected to each other by a universal joint and to said two plates by hinged joints. Again, it is the combination of the three hinges that constrain said two plates from sliding with respect to each other.

In Kimura's second embodiment the needed constraint is accomplished by fixedly attaching the bottom of each of the three actuators to the bottom of the two plates.

The advantages of these three embodiments of Kimura and Ubhayaker over the present invention is that only three actuators are required per articulation unit (the present invention requires six). The disadvantages include the fact that the joint at the hinge (with respect to its restriction of the second degree of angular motion) or at the fixed attachment of the actuator to the bottom plate is inherently weaker than the triangular structure with three universal joints, intrinsic to the present invention. This advantage leads to an inherently lighter structure for the present invention. This is, in fact, the basis of the geodesic dome. Another disadvantage is that the additional features of twist and "cross-sectional area" change are not allowed. Also, the amount of angular change is significantly less than is the case with the present invention. Finally, even though there are fewer actuators, the structures of Kimura and Ubhayaker are intrinsically more complicated in the sense of requiring more kinds of components.

Merlet ( WO 89/09120) utilizes six lengthwise elements, connecting base and fore plates, for each articulation unit. However, each of his lengthwise elements is necessarily composed of a separate actuator element connected by a universal joint to a link, whereas in the present invention, a single element, rather than what is, in effect, the double link means of Merlet is used for the lengthwise elements. For these reasons, the present invention is simpler in construction and more versatile in terms of motion capability and range of angular motion per unit length of the flexible limb.

A principle object of the present invention is versatility of motions including length change, angular change in any direction, twisting, and cross-sectional area change. A further object is lightness and optimal rigidity. A further object is modular construction both unit by unit and in terms of components within a unit. A further object is the ability to snake around obstructions. A further object is to provide a limb for grippers. A further object is to provide anchoring capability by wrapping, by insertion and expansion, or by engulfing and contraction. A further object is to provide for simple computer control without the risk of breakage of component elements due to structural over-constraint. A further object is to provide an external skeletal prosthetic device. A further object is to provide for a tapering in terms of articulation unit size and strength along a flexible limb. Finally, a further object is to provide a limb with branching capability, in which smaller flexible limbs branch out from trunk limbs.

SUMMARY OF THE INVENTION

This invention is a flexible limb capable of changing length, bending in any direction, twisting, and changing cross-sectional size. It incorporates a serial modular construction and each module incorporates a skeletal structural design which promotes optimal simplicity of control, ease of construction, lightness, and stiffness. The salient aspect of the unit structure, for the purpose of lightness, is that it features triangular sub-units connected by universal joints. Additional features may include an external skin and a branching structure.

DESCRIPTION

The basic idea of this invention is to construct a flexible-limb capable of bending in any direction, length change, area change, and twisting, wherein this flexible limb is optimally simple, light, stiff, and strong. These goals are achieved with a skeletal design consisting of a minimum number of length-change elements connected by universal joints or pivots so that the structure is not over-constrained. That is, any length-change element can change individually without breaking the structure. This allows the use of open-loop control of flexing of the limb. That is, the difficulties associated with closed-loop control, using feedback and servo-mechanisms, can be avoided.

Figure 1:
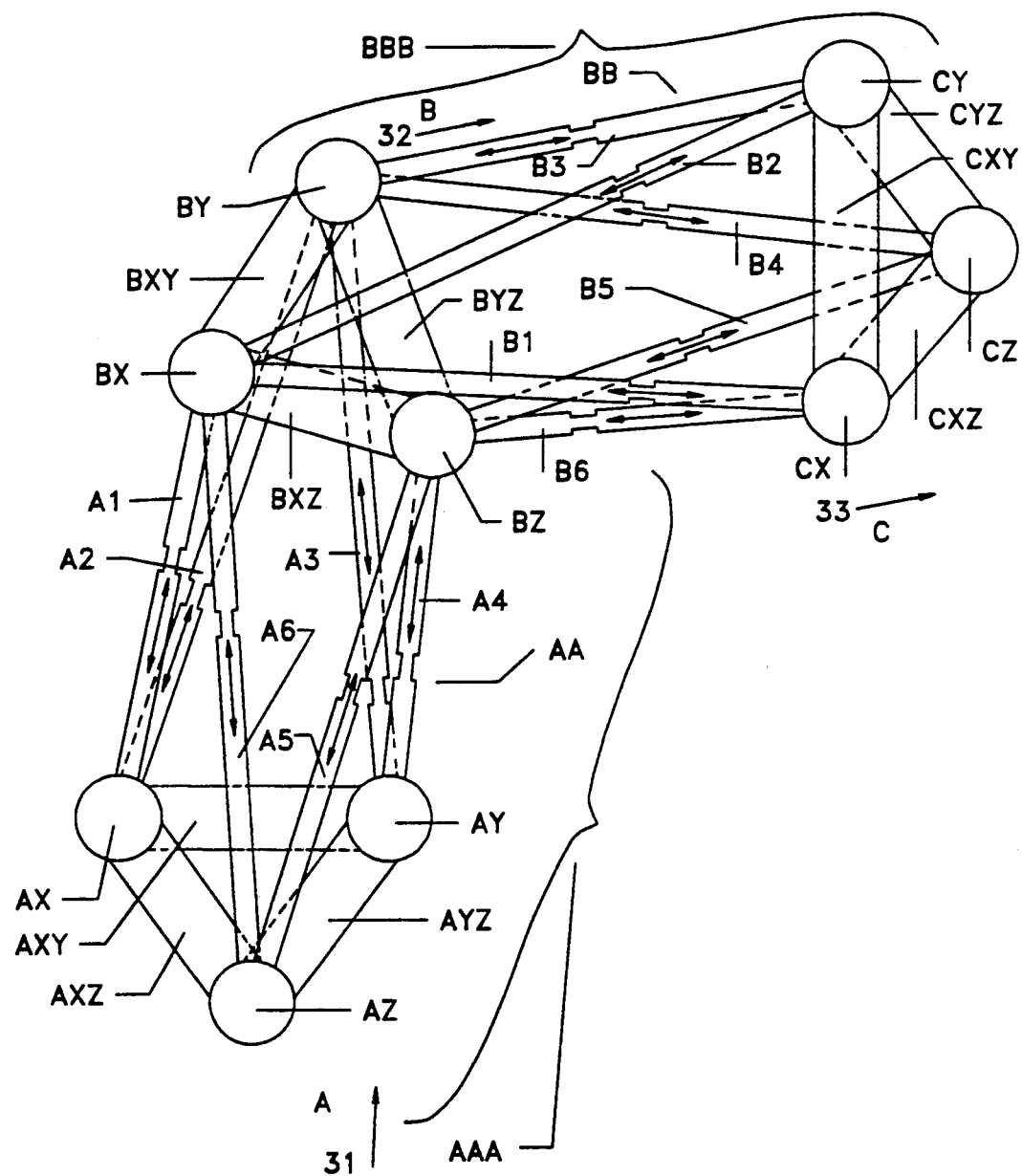
FIG. 1 is a perspective drawing of the first embodiment of the invention showing two articulation units of the flexible robotic arm.

FIG. 1 shows two articulation units, a top articulation unit and a bottom articulation unit, for the flexible limb. Each articulation unit consists of a base section, a lengthwise interconnect. That is, first unit AAA consists of first unit base section A and a fore section first unit length section AA and first unit fore section B. For example, first unit base section A consists of first unit first vertex AX which is connected by first unit first base interconnect element AXY to first unit second vertex AY, which is connected by first unit second base interconnect element AYZ to first unit third vertex AZ, which is connected by first unit third base interconnect element AXZ to first vertex AX. Also for example, first unit length section AA comprises first unit first actuator length element A1 and first unit second actuator length element A2, each of which is rotatably connected to first unit first vertex AX. First unit length section AA further comprises first unit third actuator length element A3 and first unit fourth actuator length element A3, each of which is rotatably connected to first unit second vertex AY. First unit length section AA further comprises first unit fifth actuator length element A5 and first unit sixth actuator length element A6, each of which is rotatably connected to first unit third vertex AZ.

Likewise, the first unit fore section B is equivalent to that of first unit base section A. Second articulation unit BBB and each subsequent articulation unit is equivalent to that just given of unit AAA, with fore section A of the first articulation unit forming the base section of the second articulation unit. Thus, for example, for joint vertex BX is connected to fore interconnect elements BXY and BXZ, first actuator length element A1 and sixth actuator length element A6.

Figure 2:
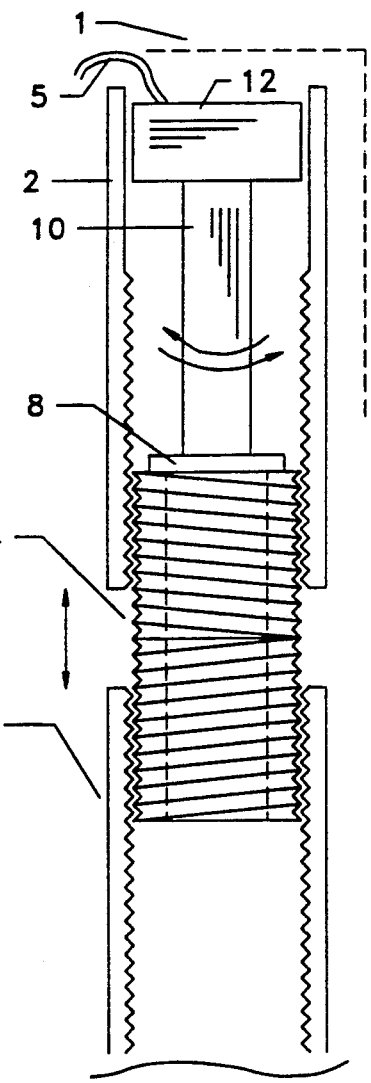
FIG. 2 is a side view of the first embodiment of the invention showing an actuator length element.

FIG. 2 depicts standard actuator length element 1 typical of those shown in FIG. 1 as A1-A6 and B1-B6. These sets of six standard actuator lengths comprise a length section such as first unit length section AA. This standard actuator length element is composed of upper female threaded rod 2, which is hollow and which is rigidly attached to actuator motor, located inside the upper section of upper female threaded rod. Actuator motor 12 with electrical leads 5 causes motor shaft 10 to rotate. When power to the motor stops the actuator retains its current length with no further power requirement. The top half of male double threaded rod 4 is normally threaded and screws into upper female threaded rod 2 by clockwise rotation; the bottom half of male double threaded rod 4 is reverse threaded and screws into lower female reverse threaded rod 6 (also hollow) by the same clockwise rotation. Thus, this clockwise rotation shortens standard actuator length element 1, and, similarly, counterclockwise rotation lengthens standard actuator length element 1.

The just-mentioned rotation is achieved due to the rigid attachment of motor shaft 10 to the top of male double threaded rod 4 via end plate 8.

Figure 3:
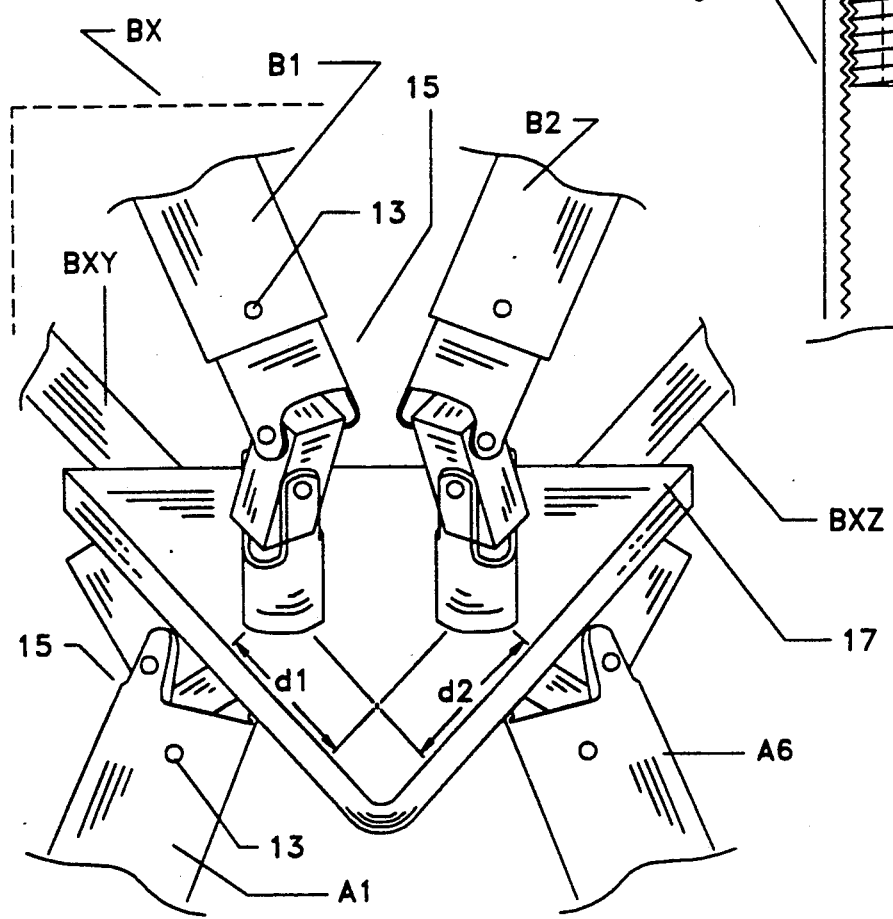
FIG. 3 is a perspective drawing of the first embodiment of the invention showing a typical vertex of six length elements.

FIG. 3 shows a typical vertex of a base section such as second unit first vertex BX. In the first embodiment of the invention, second unit first base interconnect element BXY and second unit second base interconnect element BXZ are fixed-length rods, optionally hollow, which are rigidly attached to joint plate 17. The following are rotatably attached to joint plate 17, via universal joints 15 and pins 13: on its top side, first unit first actuator length element A1 and first unit sixth actuator length element A6, and on its bottom side, second unit first actuator length element B1 and second unit second actuator length element B2.

The discussion of function of the flexible limb invention requires some definitions of standard structural elements. A unit consists of a base section, such as first unit base section A, lengthwise interconnect a section, such as first unit length section AA. and a fore section, such as first unit fore section B, which forms the base section of the succeeding unit.

This discussion will involve the relative positions and orientations of two adjacent base sections as determined by the configuration of a lengthwise interconnect section.

Likewise, each length interconnect section is composed of six actuator length elements such as first unit first actuator length element A1. Each base section is composed of three vertices, such as first unit first vertex AX, interconnected to form a triangle by three base interconnect elements such as first unit first base interconnect elements AXY.

First, assume that each base section forms a fixed equilateral triangle. Let the relative position of two adjacent base sections be specified by the unit length equal to the distance between the two center points. Both this relative distance and the bend of one articulation unit with respect to an adjacent articulation unit are determined by the set of six actuator length elements and by the set of three connective elements.

The unit length can be changed over a range that depends on the constraints of the telescopic action of the actuator length element. Typically, this range corresponds to a factor 2 or less between the minimum and maximum unit lengths. Also, it is possible to bend an articulation unit in any direction, as much as 90 degrees, by varying the lengths of the actuator length elements.

It should be understood that the configuration defined by the locations of the six universal joints 15 on joint plate 17 is not restricted to an equilateral triangle with each of the three vertices having two of the six universal joints 15. The configuration, or equivalently the polygon formed by these six locations, is, in fact, quite general, except for the following constraint. If the configuration allows any adjacent two of the six actuator length elements to be parallel in three dimensional space, the articulation unit is no longer rigid. For example, it is not allowed for the configuration shape on each end of an articulation unit to be a perfect hexagon.

FIGS. 1 and 3 show that a taper feature can be achieved in two ways. First, the lengths of the base interconnect elements such as second unit connective element BXY can be varied from articulation unit to articulation unit, along the length of the flexible limb. Or, the distance of universal joints 15 as depicted by first distance d1 and second distance d2 can be varied from articulation unit to articulation unit, along the length of the flexible limb. Also, it would be a simple matter for those skilled in the art to attach a plurality of separate flexible limbs either to the side of the flexible limb or to its end, via the base section shown in FIGS. 1 and 3.

The following discussion demonstrates how the invention lends itself to simple control strategies for limb flexing. Assume that all six actuator length elements are the same length. This means that the adjacent base sections are parallel and rotated, about the axis connecting the centers of the two base sections, 60 degrees with respect to each other. A simple control strategy is to then group the six actuator length elements into three adjacent pairs, and to change lengths in such a way that lengths of each element of a pair remain equal. This constraint allows bending in any direction without twisting.

Twisting occurs when alternating adjacent actuator length elements change by different amounts or with a different sign (increasing or decreasing).

Note that not only is it possible to independently actuate each of the six actuator length elements, but it is also possible to change only one at a time of the six actuator length elements, because the structure comprising the two base sections connected by a length section is not over-constrained. If this were not the case, that is, if this structure were over-constrained, for example by a seventh actuator length element, then the change of only one actuator length element would be impossible without breaking the structure. To prevent this breakage, it would be necessary to simultaneously change at least two of the actuator length elements with perfect control using a sophisticated servosystem. Thus, the ability to simultaneously and independently change each actuator length element is crucial for simplicity of flex control.

Figure 4:
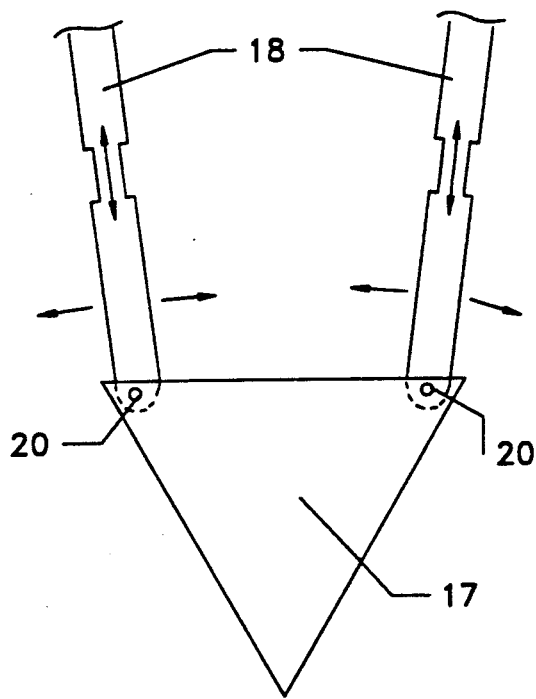
FIG. 4 is a top view of the second embodiment of the invention showing pivots for the unit base section length elements.

FIG. 4 depicts a feature of the second embodiment of the invention to change the cross-sectional area of a base section. This area change is accomplished by using an actuator length, element as shown in FIG. 2 in place of the base interconnect element such as second unit base interconnect element BXY of FIGS. 1 and 2. This replacement requires that base interconnect elements 18 be free to rotate in the plane of the base section, that is, the plane of joint plate 17. This rotation is achieved via base pivots 20 which connect base connective elements 18 to base plate 17.

One advantage of the second embodiment of the invention is the ability to either squeeze an object located inside the flexible limb or the expand within a hole into which the flexible limb has been inserted. This advantage leads to anchorage and gripping capabilities. Another advantage is that the cross-sectional area can be reduced to allow access into or through small openings, or it can be increased to achieve greater structural stiffness. For example, it is possible to achieve a taper feature in which the cross-sectional area progressively decreases along the length of the flexible limb. It should also be understood that greater versatility in terms of strength and gripping can be achieved by using a multiplicity of flexible arms. In addition, a branching feature can be easily utilized in which a multiplicity of smaller flexible limbs branch out from a trunk flexible limb, and this branching can occur more than once.

It should be understood that there are two variations of the second embodiment of the invention. For both of these embodiments the lengths of the base interconnect elements are fixed. In the first variation, base interconnect elements 18 are rotatably connected to joint element 17 via pivots 20 as shown in FIG. 4. In the second variation, base interconnect elements 18 are rotatably connected to joint element 17 via universal joints such as universal joints 15 in FIG. 3. These variations make it less likely for the connections between base interconnect elements 18 and joint element 17 to fail.

Figure 5:
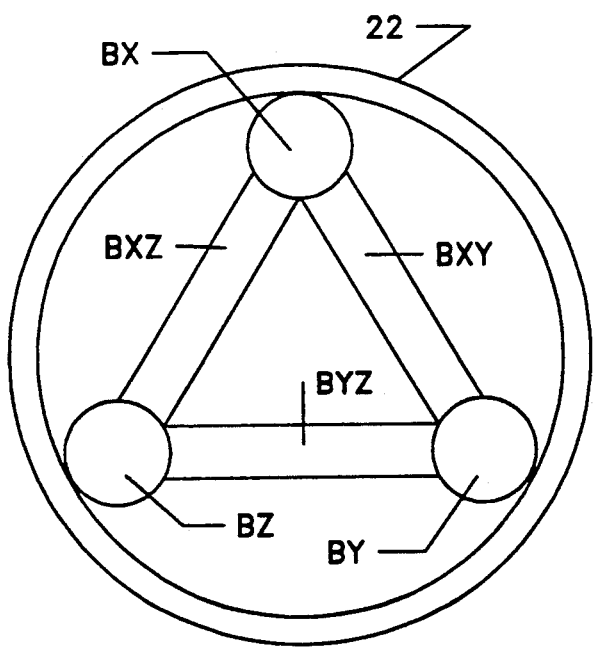
FIG. 5 is a top view of the first embodiment of the invention showing an optional outer skin.

FIG. 5 shows a cross-section of the flexible limb showing an optional feature of the first and second embodiments of the invention. Outer skin 22 extends around second unit base section B and along the length of the flexible limb, serving to protect the inner mechanisms of the invention and to aid gripping capability as the flexible limb wraps around an object. Outer skin 22 could be composed of metallic, cloth, plastic or synthetic material, in solid or mesh form.

Figure 6:
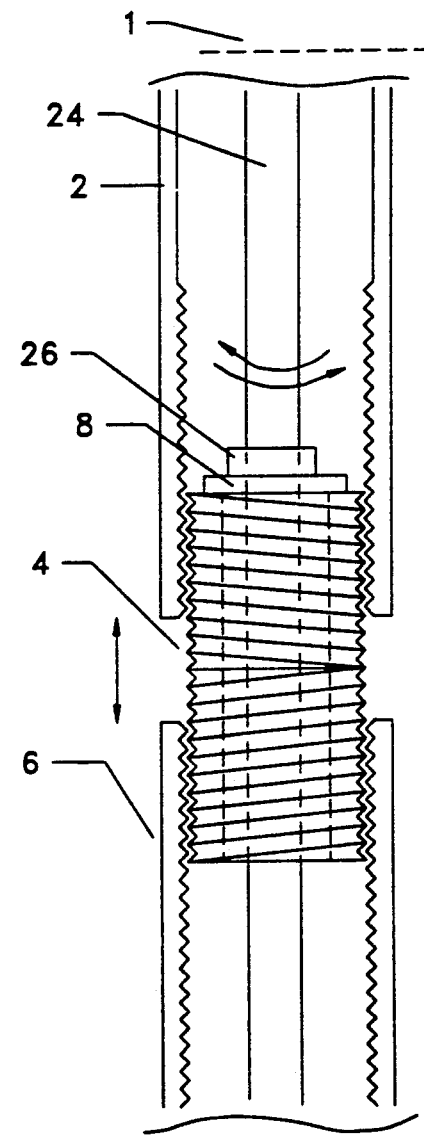
FIG. 6 is a side view of the third embodiment of the invention showing a clutch/cable drive means for an actuator length element.

FIG. 6 is a side view of the third embodiment of the invention. It is identical to FIG. 2 except that the double-screw action is achieved via torsion-drive cable 24 which is reversibly rotated by a motor external to the articulation unit and which is engaged with end plate 8 via cable clutch 26. The advantage of this embodiment is that fewer motors are required.

It should be understood that the standard actuator length element of FIG. 2 could be replaced with any manner of actuator such as hydraulic or pneumatic types, heat-driven actuator induction coils drives, or piezoelectric- or magnetostrictive-driven types. Also, the universal joints of FIG. 3 could be replaced with any manner of universal joint such as a ball and socket or a turret and pivot. Finally, the base interconnect elements of FIG. 1, such as second unit first base interconnect element BXY, that these may be curved in shape. For example, the cross-sectional shape of a base section could be circular.

The above description shall not be construed as limiting the ways in which this invention may be practiced but shall be inclusive of many other variations that do not depart from the broad interest and intent of the invention.

Having thus described the invention, what is claimed as new and described to be secured by Letters Patent is:

1. A flexible limb mechanism comprising a plurality of articulation units, serially connected, including a top articulation unit and a bottom articulation unit wherein:
  each of said articulation units comprises a base section, a fore section, and a lengthwise interconnect section, wherein the fore section of one of said articulation units comprises the base section of the succeeding articulation unit, and wherein said base section and said fore section are rotatable relative to each other, said base section comprising three base joint vertices interconnected by three base interconnect elements, said fore section comprising three fore joint vertices interconnected by three fore interconnect elements, said lengthwise interconnect section comprising six lengthwise actuators wherein each of said base joint vertices is coupled to two of said lengthwise actuators and each of said two actuators is coupled to a different one of said fore joint vertices.

2. The flexible limb mechanism of claim 1 wherein each of said base joint vertices comprises a joint plate and four universal joints, except that each of said base joint vertices of said bottom articulation unit comprises a joint plate and two universal joints, wherein each of said lengthwise actuators is coupled to a corresponding one of said universal joints.

3. The flexible limb mechanism of claim 1 wherein each of said fore joint vertices comprises a joint plate and four universal joints, except that each of said fore joint vertices of said top articulation unit comprises a joint plate and two universal joints, wherein each of said lengthwise actuators is coupled to a corresponding one of said universal joints.

4. The flexible limb mechanism of claim 1 wherein each of said base interconnect elements is a base actuator and each of said base joint vertices further comprises two pivots, each of which is coupled to one of said base actuators.

5. The flexible limb mechanism of claims 1, 2 or 3 wherein each of said fore interconnect elements is in a fore actuator and each of said fore joint vertices further comprises two pivots, each of which is coupled to one of said fore actuators.

6. The flexible limb mechanism of claims 1 or 4, wherein each of said lengthwise actuators each of said base actuators and each of said fore actuators comprises:
an upper female threaded rod;
a lower female reverse threaded rod;
a male double threaded rod, one end of which is threaded into said upper female threaded rod and the other end of which is threaded into said lower female reverse threaded rod, wherein said one end of said male double threaded rod is normally threaded and said other end of said male double threaded rod is reverse threaded;
an end plate rigidly attached to the top of said male double threaded rod; and
an actuator motor fixedly attached to said one end of said upper female threaded rod and having a rotatable shaft, wherein said shaft is fixedly attached to said end plate, whereby rotation of said shaft by said actuator motor moves said upper female threaded rod and said lower female threaded rod closer together or farther apart.

7. The flexible limb mechanism of claim 1, further comprising an outer skin covering said mechanism.

8. The flexible limb mechanism of claims 2 or 3, wherein each of said universal joints is a double-pivot joint.

9. The flexible limb mechanism of claims 1 or 4, wherein at least one of said lengthwise actuators, each of said fore actuators and each of said base actuators comprises:
an upper female threaded rod;
a lower female reverse threaded rod;
a male double threaded rod, one end of which is threaded into said upper female threaded rod and the other end of which is threaded into said lower female reverse threaded rod, wherein one end of said male double threaded rod is normally threaded and said other end of said male double threaded rod is reverse threaded;
an end plate rigidly attached to the top of said male double threaded rod; and
means for rotating said end plate either clockwise or counterclockwise.

* * * * *